(12) United States Patent
Hasegawa et al.

(10) Patent No.: US 7,012,783 B2
(45) Date of Patent: Mar. 14, 2006

(54) SEALING GLASS FOR MAGNETIC HEAD, MAGNETIC HEAD, AND MAGNETIC RECORDING/REPRODUCING DEVICE

(75) Inventors: Shinya Hasegawa, Ibaraki (JP); Mikie Kanai, Moriguchi (JP); Tetsuya Kamimoto, Hirakata (JP); Hideo Torii, Higashiosaka (JP)

(73) Assignee: Matsushita Electric Industrial Co., Ltd.

( * ) Notice: Subject to any disclaimer, the term of this patent is extended or adjusted under 35 U.S.C. 154(b) by 29 days.

(21) Appl. No.: 10/275,674

(22) PCT Filed: Mar. 5, 2002

(86) PCT No.: PCT/JP02/01992

§ 371 (c)(1),
(2), (4) Date: Jul. 15, 2003

(87) PCT Pub. No.: WO02/072493

PCT Pub. Date: Sep. 9, 2002

(65) Prior Publication Data

US 2004/0012883 A1   Jan. 22, 2004

(30) Foreign Application Priority Data

Mar. 8, 2001  (JP) .............................. 2001-064574
Oct. 29, 2001  (JP) .............................. 2001-330469

(51) Int. Cl.
*G11B 5/236*   (2006.01)

(52) U.S. Cl. ........................................ 360/120; 501/64
(58) Field of Classification Search ................ 360/120, 360/125, 126; 428/694 R; 501/14, 64
See application file for complete search history.

(56) References Cited

U.S. PATENT DOCUMENTS

| 4,816,949 A | * | 3/1989 | Yamada et al. ............. 360/120 |
| 5,084,795 A | | 1/1992 | Sakakima et al. |
| 5,204,290 A | * | 4/1993 | Mizuno et al. ............... 501/14 |
| 5,224,001 A | * | 6/1993 | Mizuno et al. ............. 360/125 |
| 5,245,492 A | * | 9/1993 | Mizuno et al. ............. 360/125 |
| 6,512,655 B1 | * | 1/2003 | Yamamoto et al. ......... 360/120 |

FOREIGN PATENT DOCUMENTS

| GB | 2 268310 | 1/1994 |
| JP | 1-199309 | 8/1989 |
| JP | 2-208811 | 8/1990 |

(Continued)

OTHER PUBLICATIONS

International Search Report corresponding to application PCT/JP02/01992 dated Jul. 2, 2002.

(Continued)

*Primary Examiner*—A. J. Heinz
*Assistant Examiner*—Mark Blouin
(74) *Attorney, Agent, or Firm*—RatnerPrestia (57) ABSTRACT

A magnetic head for a magnetic recording/reproducing device to conform to high-density recording, wherein a metal magnetic film with a high saturation flux density is employed and the mechanical strength of the sealing glass for magnetic heads, is improved thereby achieving a high reliability, high performance magnetic head. Also, this is provided a magnetic recording/reproducing device utilizing the magnetic head.

Sealing glass for magnetic heads comprising, by oxide conversion, 17.2 to 25 wt % of $SiO_2$, 1 to 10 wt % of $B_2O_3$, 58 to 75 wt % of PbO, 0.2 to 7 wt % of at least one of $Al_2O_3$ and ZnO, and 0.2 to 5 wt % of at least one of $Na_2O$ and $K_2O$, and a magnetic head and magnetic recording/reproducing device which utilize the sealing glass.

8 Claims, 4 Drawing Sheets

FOREIGN PATENT DOCUMENTS

| | | | |
|---|---|---|---|
| JP | 02208811 | * | 8/1990 |
| JP | 3-170348 | | 7/1991 |
| JP | 3-257038 | | 11/1991 |
| JP | 04-032011 | | 2/1992 |
| JP | 4-362039 | | 12/1992 |
| JP | 05-083964 | | 4/1993 |
| JP | 6-203323 | | 7/1994 |
| JP | 07-161011 | | 6/1995 |
| JP | 8277144 | | 10/1996 |
| JP | 9-326101 | | 12/1997 |

OTHER PUBLICATIONS

English translation of Form PCT/ISA/210.

* cited by examiner

SEALING GLASS FOR MAGNETIC HEAD, MAGNETIC HEAD, AND MAGNETIC RECORDING/REPRODUCING DEVICE

THIS APPLICATION IS A U.S. NATIONAL PHASE APPLICATION OF PCT INTERNATIONAL APPLICATION PCT/JP02/01992.

TECHNICAL FIELD

The present invention relates to a magnetic head suitable for recording/reproducing a large amount of magnetic information for a magnetic recording medium and a magnetic recording/reproducing device using the magnetic head and, more particularly, to sealing glass for bonding a pair of magnetic core halves constituting the magnetic head.

BACKGROUND ART

Recently, magnetic recording media with higher coercive forces have come into use as magnetic recording/reproducing devices become downsized and obtain higher capacities. As a magnetic head for high-density magnetic recording which has a sufficient capability of writing signals on such media, a metal-in-gap (MIG) head has been developed. The MIG head is a type of magnetic head in which gap opposing surfaces of a magnetic core halves are deposited with a metal magnetic film having a high saturation flux density (for example, thin films of magnetic metal materials (hereinafter abbreviated as metal magnetic film) such as Fe—Ta—N, Fe—Ta—Si—N, Fe—Nb—N, Fe—Nb—Si—B—N, Fe—Ta—C, Co—Ta—Zr—Nb, or Co—Nb—Zr—N), and then brought into abutment with each other via a magnetic gap material to be bonded with sealing glass. Conventional magnetic substances such as permalloy (Fe—Ni alloy) and Sendust (Fe—Al—Si alloy) have a relatively low saturation flux density and therefore cannot be used as the metal magnetic film of a high performance MIG head.

Figure 1:
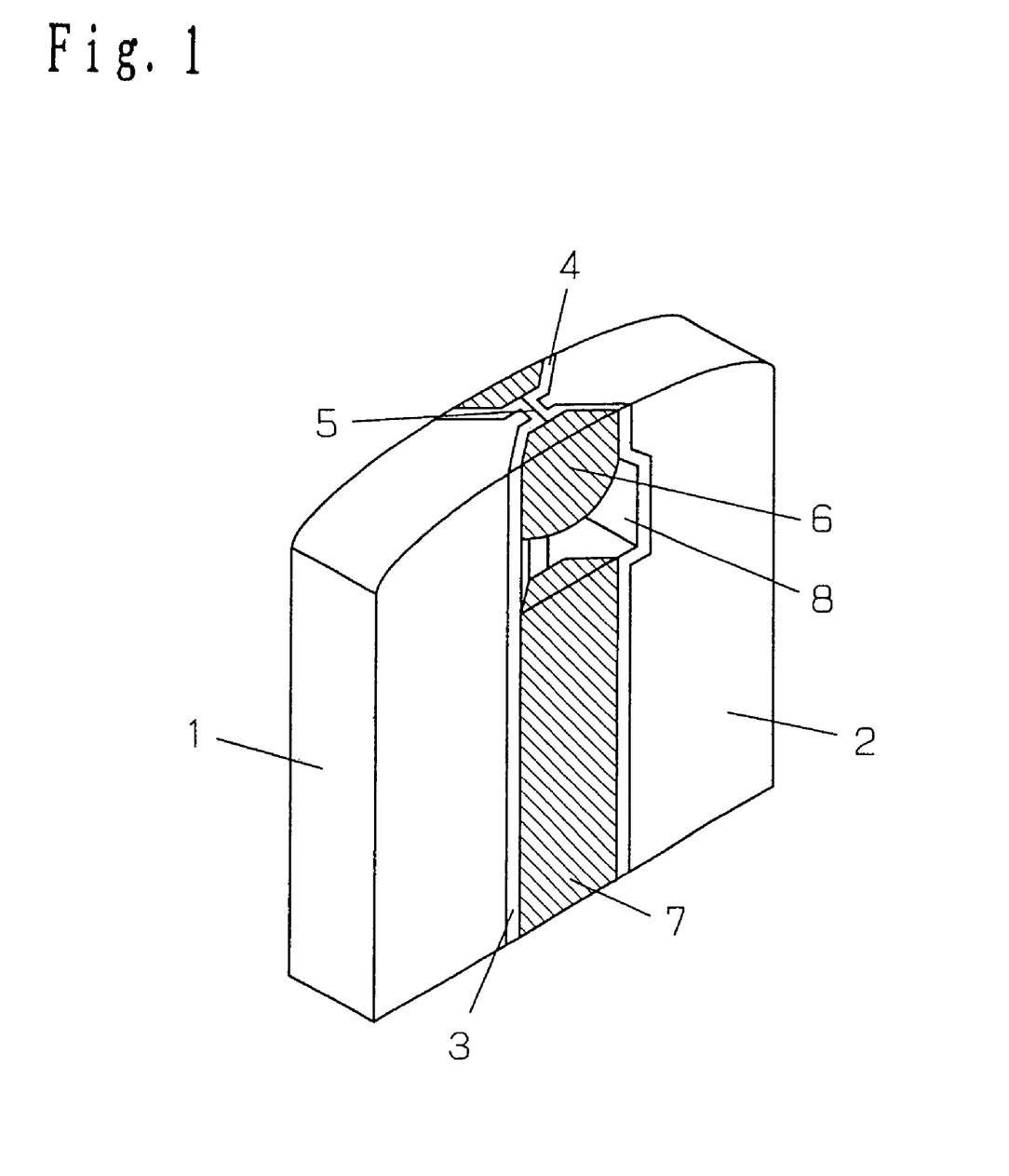
FIG. 1 is a perspective view of the magnetic head according to one embodiment of the present invention.

The structure of a MIG head is shown in FIG. 1. Metal magnetic films 3, 4 having a high saturation flux density are formed on magnetic gap opposing surfaces of magnetic core halves 1, 2 made of ferrite. The magnetic gap opposing surfaces are brought into abutment with each other via a magnetic gap material 5 and then secured with sealing glass 6, 7.

Figure 2:
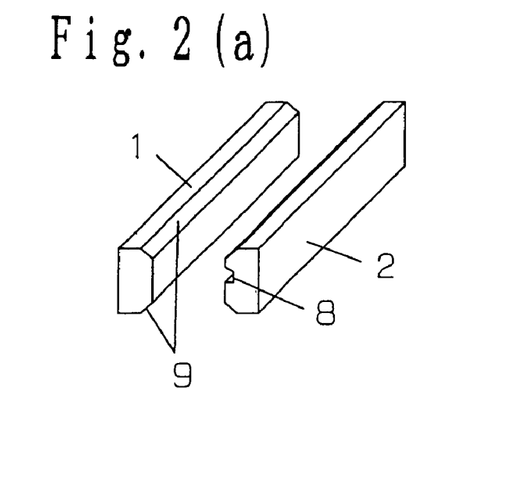
FIGS. 2(a) to 2(e) are schematic diagrams to illustrate the fabrication process of a magnetic head.

A MIG head is fabricated in a process as outlined in FIG. 2. First, a winding groove 8 and a glass groove 9 are formed on a pair of magnetic core halves 1, 2(*a*). Then, a truck groove 10 to define the truck width is formed (b). Further, metal magnetic films 3, 4 (not shown) are deposited on the ground magnetic gap opposing surfaces, and on top of which a magnetic gap material 5 (not shown) is deposited. Thereafter, magnetic gap opposing surfaces are abutted with each other and sealing glass 6, 7 are disposed in the front gap and the back gap respectively (c), and the pair of the core halves are bonded by heat treatment (d). Thus, a magnetic core block formed by bonding the magnetic core halves by molding sealing glass is cut to a predetermined size and ground to fabricate a magnetic head chip 11(*e*). This magnetic chip undergoes processes such as base bonding and wire winding to be completed as a magnetic head.

The bonding by means of sealing glass is carried out by softening, cooling, and solidifying the glass by a suitable heat treatment. During this process, to prevent thermal degradation of components such as the above described metal magnetic film, it is necessary to select sealing glass which can be used at temperatures not exceeding the heat resistant temperatures of those components. For a MIG head, it is necessary to use sealing glass which can be used in a low-temperature heat treatment not higher than 600 degrees C.

Generally, when bonding is carried out by softening and fluidizing glass by heating, an actual heat treatment is conducted at a temperature called a working point of the sealing glass to be used. Therefore, for MIG heads, sealing glass of which working point is not higher than 600 degrees C. is used. Here, the working point of glass is a characteristic temperature at which the viscosity of the glass reaches $10^3$ Pa·s thus fluidizing the glass.

However, sealing glass with a working point exceeding the heat resistant temperatures of the components of the magnetic head can be used as long as the original purpose that is to bond a pair of ferrite cores to fabricate the magnetic head is accomplished. For example, when molding is conducted by squeezing glass under pressure in a high viscosity state, sealing glass with a high working point may be used.

From the above described reason, sealing glass with an associated working point not higher than 650 degrees C. is desired for a MIG head. Sealing glass having such a low working point has been developed, which includes $SiO_2$—$B_2O_3$—PbO glass systems and $B_2O_3$—PbO—ZnO glass systems, and lead glass primarily composed of lead oxides (for example, see Japanese Patent Laid-Open No. 7-161011).

As demands for high performance, high reliability magnetic recording/reproducing devices increase recently, further development of magnetic heads with a higher record density and higher durability are desired. To cope with higher record densities, it is necessary to realize a magnetic head having a metal magnetic film having a high saturation flux density and a structure of a narrower truck width.

As an alloy film of a high saturation flux density suitable for high-density recording, an alloy TaMbXcNd is proposed, for example, in Japanese Patent Laid-Open No. 2-208811. In the formula, T is at least one kind of metal selected from the group consisting of Fe, Co, and Ni; M is at least one kind of metal selected from the group consisting of Nb, Zr, Ti, Ta, Hf, Cr, Mo, W, and Mn; X is at least one kind of half metal/semiconductor selected from the group consisting of B, Si, and Ge; N is nitrogen; and a, b, c, and d represent atomic percent where $65 \leq a \leq 93$, $4 \leq b \leq 20$, $1 \leq c \leq 20$, $2 \leq d \leq 20$, and a+b+c+d=100.

Furthermore, a TaMbXcAd alloy film which includes alloys other than the above described TaMbXcNd alloy has a high saturation flux density and is therefore suitable for high-density recording. In the formula, T is at least one kind of metal selected from the group consisting of Fe, Co, and Ni; M is at least one kind of metal selected from the group consisting of Nb, Zr, Ti, Ta, Hf, Cr, Mo, W, and Mn; X is at least one kind of half metal/semiconductor selected from the group consisting of B, Si, and Ge; A is N or C; and a, b, c, and d represent atomic percent where $65 \leq a \leq 93$, $4 \leq b \leq 20$, $0 \leq c \leq 20$, $2 \leq d \leq 20$, and a+b+c+d=100.

To accomplish a magnetic head suitable for high-density recording, a structure with a narrower truck width is also needed. To maintain the strength of such a magnetic head, it is necessary to enhance the strength of the sealing glass that serves to bond the ferrite cores. Also, since the sealing glass occupies a relatively larger area in the sliding surface of the magnetic head, the sealing glass is prone to wear during the movement of the magnetic recording medium. Therefore, it is important for sealing glass for high performance magnetic heads to have a high strength, and high wear resistance of the sliding surface.

However, there was a problem with conventional sealing glasses in that they lack mechanical strength; for example, they are susceptible to wear on the sliding surface, or prone to be fractured or chipped. For example, Japanese Patent Laid-Open No. 7-161011 discloses an embodiment of sealing glass composed of 9.9 wt % of $SiO_2$, 12.2 wt % of $B_2O_3$, 70.2 wt % of PbO, 1.6 wt % of $Al_2O_3$, 4.5 wt % of ZnO, and 1.3 wt % of $Na_2O$. However the magnetic head fabricated by using this sealing glass was found to have severe wear in the sealing glass or fractures in the magnetic head.

DISCLOSURE OF THE INVENTION

The present invention is directed to solve the above described problem, and its object is to provide a high performance, high durability magnetic head by using an alloy film of a high saturation flux density as the metal magnetic film and improving a sealing glass, thereby making its composition mechanically stronger, and a magnetic recording/reproducing device using the magnetic head.

To solve the above problem, the present invention provides a sealing glass for a magnetic head comprising, by oxide conversion, 17.2 to 25 wt % of $SiO_2$, 1 to 10 wt % of $B_2O_3$, 58 to 75 wt % of PbO, 0.2 to 7 wt % of at least one of $Al_2O_3$ and ZnO, and 0.2 to 5 wt % of at least one of $Na_2O$ and $K_2O$.

It is preferable that the sealing glass for a magnetic head mentioned above, is characterized by comprising not less than 63 wt % of PbO.

Further, it is preferable that the sealing glass for a magnetic head mentioned above is characterized by comprising not less than 0.5 wt % of $Al_2O_3$, and not less than 0.5 wt % of ZnO.

Still further, it is preferable that the sealing glass for a magnetic head mentioned above is characterized by comprising not more than 4 wt % of $Na_2O$ and $K_2O$ in total.

Further, the present invention provides a magnetic head which is configured such that a pair of magnetic core halves are bonded together by use of sealing glass, at least one of the gap opposing surfaces of said magnetic core halves being formed with a metal magnetic film and said gap opposing surfaces being abutted with each other via a magnetic gap material, wherein said sealing glass is composed of the sealing glass for a magnetic head mentioned above.

Further, said metal magnetic film is composed of a $T_aM_bX_cA_d$ alloy film, where T is at least one kind selected from the group consisting of Fe, Co, and Ni; M is at least one kind selected from the group consisting of Nb, Zr, Ti, Ta, Hf, Cr, Mo, W, and Mn; X is at least one kind of half metal/semiconductor selected from the group consisting of B, Si, and Ge; A is N or C; and a, b, c, and d represent atomic percent where $65 \leq a \leq 93$, $4 \leq b \leq 20$, $0 \leq c \leq 20$, $2 \leq d \leq 20$, and $a+b+c+d=100$.

Still further, a magnetic recording/reproducing device of the present invention is characterized by comprising the magnetic head mentioned above.

DESCRIPTION OF SYMBOLS

1, 2 magnetic core half
3, 4 metal magnetic film
5 magnetic gap material
6, 7 sealing glass
8 winding groove
9 glass groove
10 truck groove
11 magnetic head chip
12 rotary drum unit
13 lower drum
14 upper rotary drum
15 magnetic head
16 lead
17 groove
18 feed reel
19 take-up reel
20, 21, 22, 23, 24, 25 rotary post
26, 27 slant post
28 capstan
29 pinch roller
30 tension arm
31 magnetic tape

BEST MODE FOR CARRYING OUT THE INVENTION

The embodiments of sealing glass for a magnetic head, a magnetic head, and a magnetic recording/reproducing device according to the present invention will be described below.

The sealing glass for a magnetic head according to the present invention is characterized by comprising, by oxide conversion, 17.2 to 25 wt % of $SiO_2$, 1 to 10 wt % of $B_2O_3$, 58 to 75 wt % of PbO, 0.2 to 7 wt % of at least one of $Al_2O_3$ and ZnO, and 0.2 to 5 wt % of at least one of $Na_2O$ and $K_2O$.

It is more preferable that the above described sealing glass is characterized by comprising not less than 63 wt % of PbO.

It is still more preferable that the above described sealing glass is characterized by comprising not less than 0.5 wt % of $Al_2O_3$ and not less than 0.5 wt % of ZnO.

It is still more preferable that the above described sealing glass is characterized by comprising not more than 4 wt % of $Na_2O$ and $K_2O$ in total amount.

The reason of limiting each component of the sealing glass will be described in detail referring to embodiments.

The magnetic head according to the present invention is characterized in that it is configured such that a pair of magnetic core halves are bonded together by use of sealing glass, at least one of the gap opposing surfaces of said magnetic core halves having a metal magnetic film formed thereon and said gap opposing surfaces being abutted with each other via a magnetic gap material, and that the sealing glass is composed of the above described sealing glass for a magnetic head.

The above described metal magnetic film is composed of a $T_aM_bX_cA_d$ alloy film, where T is at least one kind of metal selected from the group consisting of Fe, Co, and Ni; M is at least one kind of metal selected from the group consisting of Nb, Zr, Ti, Ta, Hf, Cr, Mo, W, and Mn; X is at least one kind of half metal/semiconductor selected from the group consisting of B, Si, and Ge; A is N or C; and a, b, c, and d represent atomic percent, where $65 \leq a \leq 93$, $4 \leq b \leq 20$, $0 \leq c \leq 20$, $2 \leq d \leq 20$, and $a+b+c+d=100$.

Since a high saturation flux density metal magnetic film composed of TaMbXcAd and sealing glass of a high mechanical strength are utilized, this magnetic head offers high performance required by high-density recording with high durability.

The magnetic core, magnetic gap material, etc. of the magnetic head may be composed of conventional materials that have been used for the same purpose.

Also, for bonding the back gap side of the magnetic head, which does not slide on the magnetic recording medium, use of the sealing glass of the present invention is not a necessity as long as the construction of the magnetic head is possible.

Next, one embodiment of the magnetic recording/reproducing device according to the present invention will be described.

Figure 3:
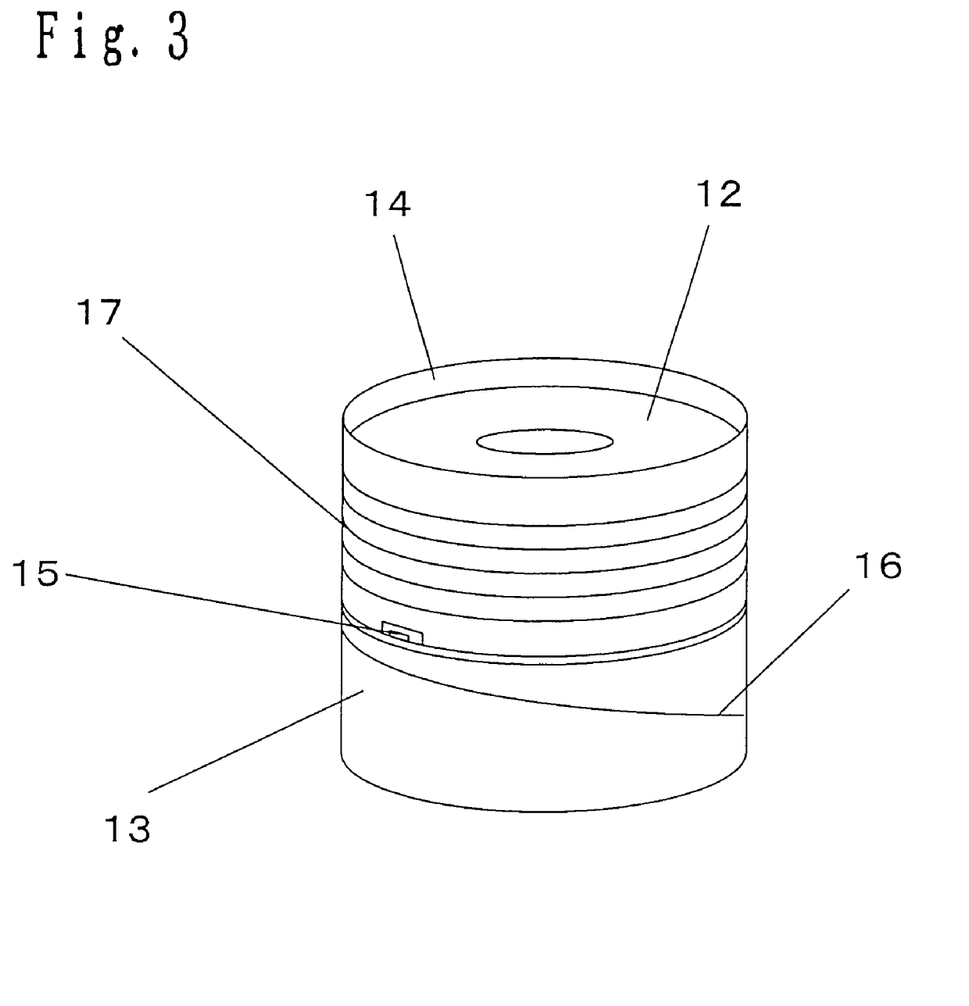
FIG. 3 is a perspective view of the rotary drum unit of the magnetic recording/reproducing device according to one embodiment of the present invention.
Figure 4:
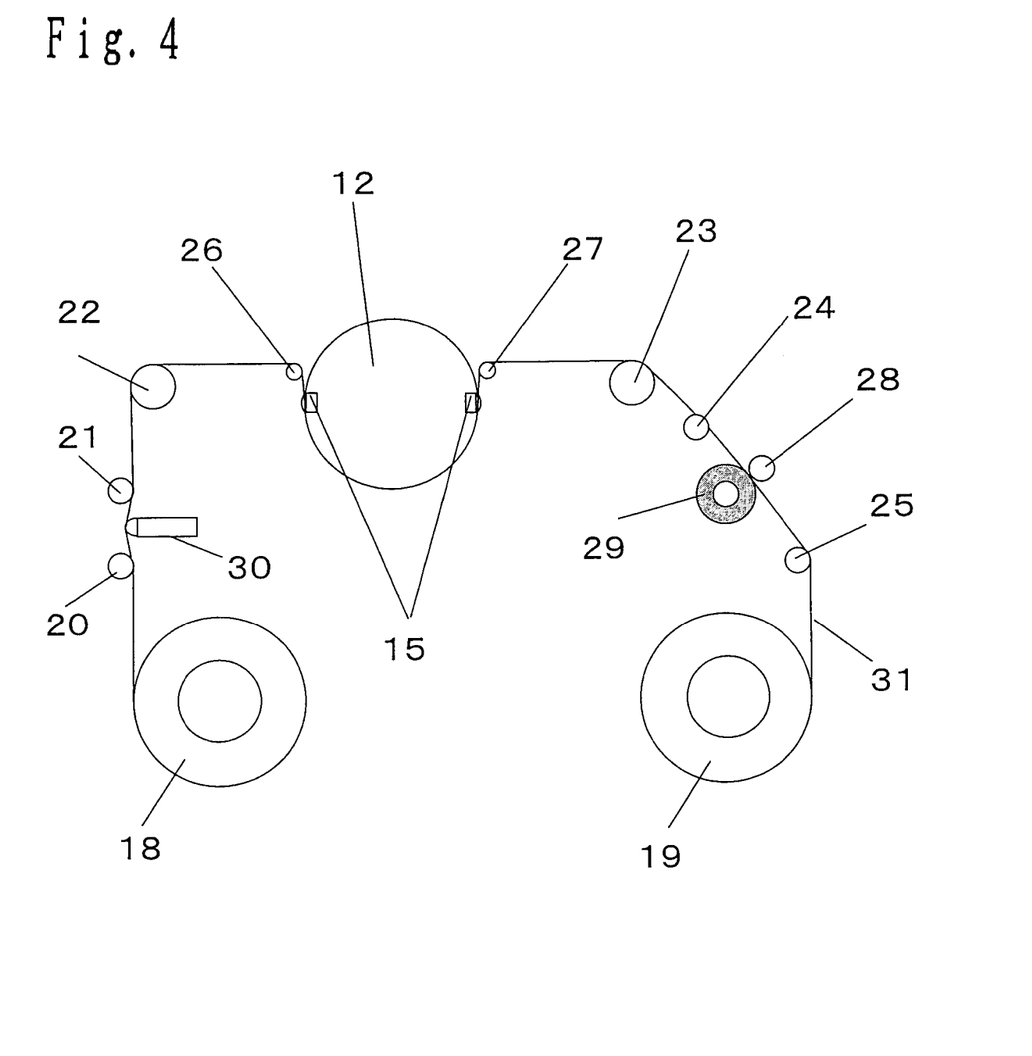
FIG. 4 is a schematic diagram of the driving system of the magnetic recording/reproducing device according to one embodiment of the present invention.

FIG. 3 is a perspective view of the rotary drum unit of the magnetic recording/reproducing device, and FIG. 4 is a schematic diagram of the driving system of the magnetic recording/reproducing device. The rotary drum unit 12 of the magnetic recording/reproducing device shown in FIG. 3 has a lower drum 13 and an upper rotary drum 14, and a magnetic head 15 is provided on the periphery of the drum unit. The magnetic tape which is not shown runs along a lead 16 in a slanted direction with respect to the rotating axis of the upper rotary drum 14. The magnetic head 15 slides in a slanted direction with respect to the running direction of the tape. And a plurality of grooves 17 are provided on the periphery of the upper rotary drum 14 so that the upper rotary drum 14 and the magnetic tape slide with each other stably in a close contact state. The air sucked into between the magnetic tape and the upper rotary drum is discharged from the groove 17.

The driving system of the magnetic recording/reproducing device comprises, as shown in FIG. 4, a rotary drum unit 12, a feed reel 18, a take-up reel 19, rotary posts 20, 21, 22, 23, 24, 25, slanted posts 26, 27, a capstan 28, a pinch roller 29, and a tension arm 30. The rotary drum unit 12 is provided on the periphery with a magnetic head 15 for recording/reproducing.

The magnetic tape 31 wound on the feed reel 18 is taken up by a take-up reel 19 passing through between the pinch roller 29 and the capstan 28. This rotary drum unit is of an upper rotary drum type and two of the magnetic heads 15 are attached in such a way that they protrude about 20 micrometers from the outer periphery of the rotary drum.

Since the magnetic recording/reproducing device of the present invention is equipped with a high performance, high durability magnetic head according to the present invention as the magnetic head 15 for recording/reproducing, it can reliably perform high-density magnetic recording/reproducing for a digital VTR, for example.

Though, in the above described embodiment, a rotary drum of an upper rotary drum type was taken for an example, it may be of a middle rotary drum type composed of an upper, middle, and lower drums. Also, though a magnetic tape has been shown as an example, the invention can also be applicable to disc type media.

Next, the present invention will be described by way of examples.

EXAMPLE 1

As the example and comparative example of the sealing glass for the magnetic head according to the present invention, glasses with various compositions shown in Tables 1 to 8 were fabricated to evaluate the working point of each composition.

The glass was fabricated by preparing and mixing the predetermined raw materials, thereafter putting the mixture into a crucible, and melting it in an electric furnace at 1000 to 1200 degrees C for an hour followed by a rapid cooling.

The viscosity of the molten glass was measured to determine the working point of each composition from the temperature at which the viscosity is $10^3$ Pa*s.

Table 1 shows the glass compositions fabricated to investigate the $SiO_2$ content. Nos. 2 to 4 are examples of the present invention, and Nos. 1 and 5 are comparative examples.

Table 2 shows the glass compositions fabricated to investigate the content of $B_2O_3$. Nos. 7 to 9 are examples of the present invention, and Nos. 6 and 10 are comparative examples.

Table 3 shows the glass compositions fabricated to investigate the content of PbO. Nos. 12 to 14 are examples of the present invention and Nos. 11 and 15 are comparative examples.

Table 4 shows the glass compositions fabricated to investigate the content of at least one of $Al_2O_3$ and ZnO. Nos. 19 to 24 are examples of the present invention, and Nos. 16 to 18 and Nos. 25 to 27 are comparative examples.

Table 5 shows the glass compositions fabricated to investigate the content of $Na_2O$ and $K_2O$. Nos. 31 to 36 are examples of the present invention, and Nos. 28 to 30 and Nos. 37 to 39 are comparative examples.

TABLE 1

| No. | Comparative Example | Example | | | Comparative Example |
|---|---|---|---|---|---|
| | 1 | 2 | 3 | 4 | 5 |
| Glass composition (wt %) | | | | | |
| $SiO_2$ | 15.1 | 17.2 | 22.1 | 25.0 | 27.7 |
| $B_2O_3$ | 9.3 | 6.1 | 5.0 | 2.3 | 1.0 |
| PbO | 68.0 | 74.3 | 66.5 | 65.3 | 65.1 |
| $Al_2O_3$ | 1.3 | 1.8 | 1.7 | 3.1 | 5.2 |
| ZnO | 4.2 | | 1.9 | 1.4 | |
| $Na_2O$ | 2.1 | | 1.1 | 2.9 | |
| $K_2O$ | | 0.6 | 1.7 | | 1.0 |
| Working point (° C.) | 560 | 565 | 605 | 650 | 700 |
| Glass wear depth (μm) | | | | | |
| Metal magnetic film | | | | | |
| $Fe_{75}Ta_{10}N_{15}$ | 0.59 | 0.17 | 0.15 | 0.14 | — |
| $Fe_{73}Ta_8Si_{13}N_6$ | 0.58 | 0.15 | 0.15 | 0.14 | — |
| $Fe_{72}Nb_{12}Si_6N_{10}$ | 0.62 | 0.14 | 0.14 | 0.14 | — |
| $Fe_{76}Nb_8Si_2B_{12}N_2$ | 0.59 | 0.15 | 0.15 | 0.14 | — |
| $Fe_{72}Ni_{10}W_1Nb_{10}Ge_1N_6$ | 0.60 | 0.16 | 0.16 | 0.15 | — |
| $Fe_{79}Ta_9C_{12}$ | 0.61 | 0.15 | 0.15 | 0.13 | — |
| $Co_{92}Nb_4B_1N_3$ | 0.58 | 0.15 | 0.15 | 0.15 | — |
| $Co_{70}Nb_{10}Hf_5B_1N_{14}$ | 0.60 | 0.16 | 0.14 | 0.15 | — |
| $Co_{78}Nb_6Zr_4B_2N_{10}$ | 0.60 | 0.17 | 0.15 | 0.14 | — |

TABLE 1-continued

|  | Comparative Example | Example | | | Comparative Example |
|---|---|---|---|---|---|
| No. | 1 | 2 | 3 | 4 | 5 |
| $Co_{65}Ti_4Ta_4B_{20}N_7$ | 0.59 | 0.15 | 0.16 | 0.14 | — |
| $Co_{73}Mo_7Cr_6Zr_7B_3N_4$ | 0.62 | 0.16 | 0.15 | 0.15 | — |
| $Co_{70}Mn_6Nb_7B_{15}N_2$ | 0.60 | 0.15 | 0.15 | 0.14 | — |

TABLE 2

|  | Comparative Example | Example | | | Comparative Example |
|---|---|---|---|---|---|
| No. | 6 | 7 | 8 | 9 | 10 |
| Glass composition (wt %) | | | | | |
| $SiO_2$ | 24.7 | 23.9 | 18.6 | 17.3 | 17.4 |
| $B_2O_3$ | 0.5 | 1.0 | 5.8 | 10.0 | 12.0 |
| PbO | 65.1 | 66.3 | 69.7 | 67.9 | 64.0 |
| $Al_2O_3$ | 5.6 | 3.2 | 1.8 | 1.3 | 0.7 |
| ZnO | 1.4 | 2.4 | 1.6 | 1.4 | 3.9 |
| $Na_2O$ | 1.0 | 2.9 |  | 2.1 | 1.1 |
| $K_2O$ | 1.7 | 0.3 | 2.5 |  | 0.9 |
| Working point (° C.) | 670 | 650 | 590 | 580 | 575 |
| Glass wear depth (μm) | | | | | |
| Metal magnetic film | | | | | |
| $Fe_{75}Ta_{10}N_{15}$ | — | 0.14 | 0.15 | 0.15 | 0.47 |
| $Fe_{73}Ta_8Si_{13}N_6$ | — | 0.13 | 0.15 | 0.16 | 0.49 |
| $Fe_{72}Nb_{12}Si_6N_{10}$ | — | 0.14 | 0.14 | 0.15 | 0.50 |
| $Fe_{76}Nb_8Si_2B_{12}N_2$ | — | 0.14 | 0.15 | 0.15 | 0.48 |
| $Fe_{72}Ni_{10}W_1Nb_{10}Ge_1N_6$ | — | 0.15 | 0.15 | 0.14 | 0.50 |
| $Fe_{79}Ta_9C_{12}$ | — | 0.14 | 0.14 | 0.15 | 0.48 |
| $Co_{92}Nb_4B_1N_3$ | — | 0.14 | 0.15 | 0.15 | 0.49 |
| $Co_{70}Nb_{10}Hf_5B_1N_{14}$ | — | 0.15 | 0.15 | 0.16 | 0.50 |
| $Co_{78}Nb_6Zr_4B_2N_{10}$ | — | 0.15 | 0.14 | 0.16 | 0.51 |
| $Co_{65}Ti_4Ta_4B_{20}N_7$ | — | 0.15 | 0.16 | 0.15 | 0.50 |

TABLE 2-continued

|  | Comparative Example | Example | | | Comparative Example |
|---|---|---|---|---|---|
| No. | 6 | 7 | 8 | 9 | 10 |
| $Co_{73}Mo_7Cr_6Zr_7B_3N_4$ | — | 0.13 | 0.14 | 0.14 | 0.48 |
| $Co_{70}Mn_6Nb_7B_{15}N_2$ | — | 0.14 | 0.14 | 0.16 | 0.49 |

TABLE 3

|  | Comparative Example | Example | | | Comparative Example |
|---|---|---|---|---|---|
| No. | 11 | 12 | 13 | 14 | 15 |
| Glass composition (wt %) | | | | | |
| $SiO_2$ | 23.9 | 23.4 | 18.6 | 17.6 | 17.2 |
| $B_2O_3$ | 8.1 | 6.9 | 5.8 | 5.5 | 3.1 |
| PbO | 56.1 | 58.0 | 69.8 | 75.0 | 76.0 |
| $Al_2O_3$ | 5.7 | 6.0 | 2.6 | 0.4 | 0.7 |
| ZnO | 1.3 | 0.9 |  | 0.8 |  |
| $Na_2O$ | 2.0 | 2.8 |  | 0.1 | 1.0 |
| $K_2O$ | 2.9 | 2.0 | 3.2 | 0.6 | 2.0 |
| Working point (° C.) | 660 | 645 | 590 | 555 | 545 |
| Glass wear depth (μm) | | | | | |
| Metal magnetic film | | | | | |
| $Fe_{75}Ta_{10}N_{15}$ | — | 0.12 | 0.15 | 0.14 | 0.58 |
| $Fe_{73}Ta_8Si_{13}N_6$ | — | 0.13 | 0.14 | 0.15 | 0.57 |
| $Fe_{72}Nb_{12}Si_6N_{10}$ | — | 0.13 | 0.14 | 0.15 | 0.57 |
| $Fe_{76}Nb_8Si_2B_{12}N_2$ | — | 0.12 | 0.14 | 0.15 | 0.59 |
| $Fe_{72}Ni_{10}W_1Nb_{10}Ge_1N_6$ | — | 0.13 | 0.15 | 0.15 | 0.58 |
| $Fe_{79}Ta_9C_{12}$ | — | 0.13 | 0.13 | 0.16 | 0.57 |
| $Co_{92}Nb_4B_1N_3$ | — | 0.14 | 0.14 | 0.15 | 0.58 |
| $Co_{70}Nb_{10}Hf_5B_1N_{14}$ | — | 0.13 | 0.14 | 0.15 | 0.58 |
| $Co_{78}Nb_6Zr_4B_2N_{10}$ | — | 0.13 | 0.15 | 0.16 | 0.58 |
| $Co_{65}Ti_4Ta_4B_{20}N_7$ | — | 0.13 | 0.15 | 0.14 | 0.59 |
| $Co_{73}Mo_7Cr_6Zr_7B_3N_4$ | — | 0.14 | 0.14 | 0.15 | 0.59 |
| $Co_{70}Mn_6Nb_7B_{15}N_2$ | — | 0.13 | 0.14 | 0.15 | 0.60 |

TABLE 4

|  | Comparative Example | Example | | | | | | | | Comparative Example | | |
|---|---|---|---|---|---|---|---|---|---|---|---|---|
| No. | 16 | 17 | 18 | 19 | 20 | 21 | 22 | 23 | 24 | 25 | 26 | 27 |
| Glass composition (wt %) | | | | | | | | | | | | |
| $SiO_2$ | 17.5 | 17.5 | 17.5 | 17.5 | 17.5 | 17.5 | 20.7 | 20.7 | 20.7 | 22.9 | 22.9 | 22.9 |
| $B_2O_3$ | 6.1 | 6.1 | 6.1 | 6.1 | 6.1 | 6.1 | 4.0 | 4.0 | 4.0 | 2.3 | 2.3 | 2.3 |

TABLE 4-continued

| | Comparative Example | | | Example | | | | | | Comparative Example | | |
|---|---|---|---|---|---|---|---|---|---|---|---|---|
| No. | 16 | 17 | 18 | 19 | 20 | 21 | 22 | 23 | 24 | 25 | 26 | 27 |
| PbO | 74.5 | 74.4 | 74.4 | 74.3 | 74.3 | 74.3 | 66.6 | 66.6 | 66.6 | 63.5 | 63.5 | 63.5 |
| $Al_2O_3$ | | 0.1 | | 0.1 | 0.2 | | 3.3 | 7.0 | | 4.0 | 8.5 | |
| ZnO | | | 0.1 | 0.1 | | 0.2 | 3.7 | | 7.0 | 4.5 | | 8.5 |
| $Na_2O$ | 0.9 | 0.9 | 0.9 | 0.9 | 0.9 | 0.9 | | | | 1.7 | 1.7 | 1.7 |
| $K_2O$ | 1.0 | 1.0 | 1.0 | 1.0 | 1.0 | 1.0 | 1.7 | 1.7 | 1.7 | 1.1 | 1.1 | 1.1 |
| Working point (° C.) | 560 | 560 | 560 | 560 | 565 | 565 | 630 | 635 | 630 | 660 | 665 | 655 |
| Glass wear depth (μm) | | | | | | | | | | | | |
| Metal magnetic film | | | | | | | | | | | | |
| $Fe_{75}Ta_{10}N_{15}$ | 0.53 | 0.48 | 0.50 | 0.18 | 0.16 | 0.17 | 0.14 | 0.13 | 0.14 | — | — | — |
| $Fe_{73}Ta_8Si_{13}N_6$ | 0.55 | 0.47 | 0.50 | 0.17 | 0.17 | 0.18 | 0.14 | 0.13 | 0.14 | — | — | — |
| $Fe_{72}Nb_{12}Si_6N_{10}$ | 0.54 | 0.48 | 0.49 | 0.17 | 0.17 | 0.17 | 0.15 | 0.13 | 0.15 | — | — | — |
| $Fe_{76}Nb_8Si_2B_{12}N_2$ | 0.55 | 0.50 | 0.51 | 0.18 | 0.17 | 0.17 | 0.16 | 0.14 | 0.15 | — | — | — |
| $Fe_{72}Ni_{10}W_1Nb_{10}Ge_1N_6$ | 0.56 | 0.49 | 0.51 | 0.17 | 0.16 | 0.17 | 0.15 | 0.13 | 0.14 | — | — | — |
| $Fe_{79}Ta_9C_{12}$ | 0.57 | 0.48 | 0.50 | 0.18 | 0.17 | 0.18 | 0.14 | 0.13 | 0.15 | — | — | — |
| $Co_{92}Nb_4B_1N_3$ | 0.58 | 0.49 | 0.51 | 0.18 | 0.16 | 0.18 | 0.14 | 0.13 | 0.14 | — | — | — |
| $Co_{70}Nb_{10}Hf_5B_1N_{14}$ | 0.55 | 0.48 | 0.50 | 0.18 | 0.17 | 0.17 | 0.15 | 0.14 | 0.14 | — | — | — |
| $Co_{78}Nb_6Zr_4B_2N_{10}$ | 0.53 | 0.50 | 0.50 | 0.17 | 0.17 | 0.16 | 0.14 | 0.13 | 0.15 | — | — | — |
| $Co_{65}Ti_4Ta_4B_{20}N_7$ | 0.54 | 0.49 | 0.50 | 0.17 | 0.16 | 0.17 | 0.14 | 0.13 | 0.15 | — | — | — |
| $Co_{73}Mo_7Cr_6Zr_7B_3N_4$ | 0.55 | 0.48 | 0.50 | 0.18 | 0.17 | 0.17 | 0.15 | 0.13 | 0.15 | — | — | — |
| $Co_{70}Mn_6Nb_7B_{15}N_2$ | 0.55 | 0.50 | 0.50 | 0.18 | 0.16 | 0.18 | 0.14 | 0.13 | 0.14 | — | — | — |

TABLE 5

| | Comparative Example | | | Example | | | | | | Comparative Example | | |
|---|---|---|---|---|---|---|---|---|---|---|---|---|
| No. | 28 | 29 | 30 | 31 | 32 | 33 | 34 | 35 | 36 | 37 | 38 | 39 |
| Glass composition (wt %) | | | | | | | | | | | | |
| $SiO_2$ | 23.5 | 23.4 | 23.4 | 23.1 | 23.1 | 23.1 | 18.6 | 18.6 | 18.6 | 17.3 | 17.3 | 17.3 |
| $B_2O_3$ | 4.5 | 4.5 | 4.5 | 4.3 | 4.3 | 4.3 | 5.8 | 5.8 | 5.8 | 6.3 | 6.3 | 6.3 |
| PbO | 66.8 | 66.8 | 66.8 | 67.6 | 67.6 | 67.6 | 68.8 | 68.8 | 68.8 | 68.2 | 68.2 | 68.2 |
| $Al_2O_3$ | 3.0 | 3.0 | 3.0 | 2.8 | 2.8 | 2.8 | | | | 0.5 | 0.5 | 0.5 |
| ZnO | 2.2 | 2.2 | 2.2 | 2.0 | 2.0 | 2.0 | 1.8 | 1.8 | 1.8 | 1.2 | 1.2 | 1.2 |
| $Na_2O$ | | 0.1 | | 0.1 | 0.2 | | 2.2 | 5.0 | | 3.0 | 6.5 | |
| $K_2O$ | | | 0.1 | 0.1 | | 0.2 | 2.8 | | 5.0 | 3.5 | | 6.5 |
| Working point (° C.) | 665 | 660 | 660 | 650 | 650 | 650 | 575 | 570 | 565 | 550 | 545 | 545 |
| Glass wear depth (μm) | | | | | | | | | | | | |
| Metal magnetic film | | | | | | | | | | | | |
| $Fe_{75}Ta_{10}N_{15}$ | — | — | — | 0.12 | 0.11 | 0.13 | 0.16 | 0.18 | 0.18 | 0.42 | 0.51 | 0.55 |
| $Fe_{73}Ta_8Si_{13}N_6$ | — | — | — | 0.12 | 0.12 | 0.13 | 0.15 | 0.17 | 0.18 | 0.44 | 0.50 | 0.54 |
| $Fe_{72}Nb_{12}Si_6N_{10}$ | — | — | — | 0.13 | 0.13 | 0.14 | 0.16 | 0.18 | 0.17 | 0.43 | 0.50 | 0.54 |
| $Fe_{76}Nb_8Si_2B_{12}N_2$ | — | — | — | 0.12 | 0.12 | 0.13 | 0.16 | 0.19 | 0.19 | 0.44 | 0.52 | 0.53 |
| $Fe_{72}Ni_{10}W_1Nb_{10}Ge_1N_6$ | — | — | — | 0.13 | 0.12 | 0.13 | 0.16 | 0.17 | 0.18 | 0.42 | 0.49 | 0.52 |
| $Fe_{79}Ta_9C_{12}$ | — | — | — | 0.12 | 0.12 | 0.12 | 0.15 | 0.18 | 0.18 | 0.43 | 0.50 | 0.55 |
| $Co_{92}Nb_4B_1N_3$ | — | — | — | 0.12 | 0.13 | 0.13 | 0.17 | 0.18 | 0.19 | 0.44 | 0.51 | 0.54 |
| $Co_{70}Nb_{10}Hf_5B_1N_{14}$ | — | — | — | 0.13 | 0.12 | 0.13 | 0.16 | 0.19 | 0.18 | 0.42 | 0.50 | 0.55 |
| $Co_{78}Nb_6Zr_4B_2N_{10}$ | — | — | — | 0.13 | 0.12 | 0.13 | 0.15 | 0.17 | 0.17 | 0.45 | 0.50 | 0.54 |
| $Co_{65}Ti_4Ta_4B_{20}N_7$ | — | — | — | 0.12 | 0.12 | 0.12 | 0.16 | 0.18 | 0.18 | 0.43 | 0.51 | 0.53 |
| $Co_{73}Mo_7Cr_6Zr_7B_3N_4$ | — | — | — | 0.13 | 0.11 | 0.13 | 0.17 | 0.19 | 0.18 | 0.44 | 0.52 | 0.53 |
| $Co_{70}Mn_6Nb_7B_{15}N_2$ | — | — | — | 0.12 | 0.12 | 0.13 | 0.17 | 0.17 | 0.18 | 0.45 | 0.51 | 0.55 |

Moreover, Table 6 shows the glass compositions fabricated to investigate the content of PbO. Nos. 42 to 44 are examples of the present invention, and Nos. 40 and 41 are comparative examples.

Furthermore, Table 7 shows the glass compositions fabricated to investigate the contents of $Al_2O_3$ and ZnO. Nos. 45 to 50 are examples of the present invention, and Nos. 51 to 55 are comparative examples.

Furthermore, Table 8 shows the glass compositions fabricated to investigate the contents of $Na_2O$ and $K_2O$. Nos. 56 to 58 are examples of the present invention, and Nos. 59 to 61 are comparative examples.

TABLE 6

| | Comparative Example | | Example | | |
|---|---|---|---|---|---|
| No. | 40 | 41 | 42 | 43 | 44 |
| Glass composition (wt %) | | | | | |
| $SiO_2$ | 23.4 | 23.0 | 20.7 | 22.1 | 19.6 |
| $B_2O_3$ | 6.9 | 5.3 | 5.0 | 5.0 | 5.8 |

TABLE 6-continued

|  | Comparative Example | Example | | | |
|---|---|---|---|---|---|
| No. | 40 | 41 | 42 | 43 | 44 |
| PbO | 58.0 | 61.3 | 63.0 | 66.5 | 69.7 |
| $Al_2O_3$ | 6.0 | 2.1 | 3.1 | 1.7 | 2.1 |
| ZnO | 0.9 | 3.5 | 3.8 | 1.9 | 1.3 |
| $Na_2O$ | 2.8 | 3.2 | 2.2 | 1.1 | |
| $K_2O$ | 2.0 | 1.6 | 2.2 | 1.7 | 1.5 |
| Working point (° C.) | 645 | 640 | 635 | 605 | 600 |
| Yield (%) | | | | | |
| Metal magnetic film | | | | | |
| $Fe_{75}Ta_{10}N_{15}$ | 63 | 71 | 94 | 92 | 97 |
| $Fe_{73}Ta_8Si_{13}N_6$ | 58 | 65 | 93 | 95 | 96 |

TABLE 6-continued

|  | Comparative Example | Example | | | |
|---|---|---|---|---|---|
| No. | 40 | 41 | 42 | 43 | 44 |
| $Fe_{72}Nb_{12}Si_6N_{10}$ | 60 | 68 | 92 | 92 | 94 |
| $Fe_{76}Nb_8Si_2B_{12}N_2$ | 57 | 72 | 93 | 93 | 95 |
| $Fe_{72}Ni_{10}W_1Nb_{10}Ge_1N_6$ | 59 | 66 | 95 | 94 | 96 |
| $Fe_{79}Ta_9C_{12}$ | 61 | 67 | 92 | 93 | 97 |
| $Co_{92}Nb_4B_1N_3$ | 62 | 69 | 94 | 93 | 96 |
| $Co_{70}Nb_{10}Hf_5B_1N_{14}$ | 61 | 70 | 94 | 93 | 94 |
| $Co_{78}Nb_6Zr_4B_2N_{10}$ | 66 | 65 | 93 | 94 | 93 |
| $Co_{65}Ti_4Ta_4B_{20}N_7$ | 63 | 64 | 92 | 95 | 95 |
| $Co_{73}Mo_7Cr_6Zr_7B_3N_4$ | 56 | 62 | 92 | 93 | 95 |
| $Co_{70}Mn_6Nb_7B_{15}N_2$ | 62 | 68 | 94 | 92 | 94 |

TABLE 7

|  | Example | | | | | | Comparative Example | | | | |
|---|---|---|---|---|---|---|---|---|---|---|---|
| No. | 45 | 46 | 47 | 48 | 49 | 50 | 51 | 52 | 53 | 54 | 55 |
| Glass composition (wt %) | | | | | | | | | | | |
| $SiO_2$ | 22.1 | 23.9 | 18.6 | 17.3 | 17.3 | 18.4 | 17.7 | 17.2 | 18.7 | 17.4 | 17.5 |
| $B_2O_3$ | 5.0 | 1.0 | 5.8 | 6.7 | 9.5 | 10.0 | 5.9 | 3.1 | 6.5 | 6.0 | 6.1 |
| PbO | 66.5 | 66.3 | 69.7 | 70.2 | 68.8 | 68.1 | 74.5 | 75.0 | 69.9 | 74.3 | 73.9 |
| $Al_2O_3$ | 1.7 | 3.2 | 1.8 | 0.5 | 2.0 | 0.5 | 0.2 | 1.0 | | 0.7 | 0.2 |
| ZnO | 1.9 | 2.4 | 1.6 | 1.2 | 0.5 | 0.5 | 0.8 | 0.1 | 1.0 | | 0.2 |
| $Na_2O$ | 1.1 | 2.9 | | 1.0 | | 2.0 | 0.5 | 1.0 | 1.2 | 0.9 | 1.1 |
| $K_2O$ | 1.7 | 0.3 | 2.5 | 3.1 | 1.9 | 0.5 | 0.4 | 2.6 | 2.7 | 0.7 | 1.0 |
| Working point (° C.) | 605 | 650 | 590 | 550 | 580 | 575 | 555 | 550 | 575 | 570 | 565 |
| State of glass at sliding surface | | | | | | | | | | | |
| Metal magnetic film | | | | | | | | | | | |
| $Fe_{75}Ta_{10}N_{15}$ | ○ | ○ | ○ | ○ | ○ | ○ | X | X | X | X | X |
| $Fe_{73}Ta_8Si_{13}N_6$ | ○ | ○ | ○ | ○ | ○ | ○ | X | X | X | X | X |
| $Fe_{72}Nb_{12}Si_6N_{10}$ | ○ | ○ | ○ | ○ | ○ | ○ | X | X | X | X | X |
| $Fe_{76}Nb_8Si_2B_{12}N_2$ | ○ | ○ | ○ | ○ | ○ | ○ | X | X | X | X | X |
| $Fe_{72}Ni_{10}W_1Nb_{10}Ge_1N_6$ | ○ | ○ | ○ | ○ | ○ | ○ | X | X | X | X | X |
| $Fe_{79}Ta_9C_{12}$ | ○ | ○ | ○ | ○ | ○ | ○ | X | X | X | X | X |
| $Co_{92}Nb_4B_1N_3$ | ○ | ○ | ○ | ○ | ○ | ○ | X | X | X | X | X |
| $Co_{70}Nb_{10}Hf_5B_1N_{14}$ | ○ | ○ | ○ | ○ | ○ | ○ | X | X | X | X | X |
| $Co_{78}Nb_6Zr_4B_2N_{10}$ | ○ | ○ | ○ | ○ | ○ | ○ | X | X | X | X | X |
| $Co_{65}Ti_4Ta_4B_{20}N_7$ | ○ | ○ | ○ | ○ | ○ | ○ | X | X | X | X | X |
| $Co_{73}Mo_7Cr_6Zr_7B_3N_4$ | ○ | ○ | ○ | ○ | ○ | ○ | X | X | X | X | X |
| $Co_{70}Mn_6Nb_7B_{15}N_2$ | ○ | ○ | ○ | ○ | ○ | ○ | X | X | X | X | X |

TABLE 8

|  | Example | | | Comparative Example | | |
|---|---|---|---|---|---|---|
| No. | 56 | 57 | 58 | 59 | 60 | 61 |
| Glass composition (wt %) | | | | | | |
| $SiO_2$ | 23.9 | 18.6 | 17.3 | 18.2 | 18.6 | 17.3 |
| $B_2O_3$ | 1.0 | 6.0 | 6.7 | 5.8 | 6.0 | 6.7 |
| PbO | 66.3 | 69.6 | 70.3 | 68.8 | 68.6 | 69.5 |
| $Al_2O_3$ | 3.2 | 0.5 | 0.5 | 0.9 | 0.5 | 0.5 |
| ZnO | 2.4 | 1.3 | 1.2 | 1.3 | 1.3 | 1.2 |
| $Na_2O$ | 2.9 | 4.0 |  | 2.2 | 4.0 | 0.8 |
| $K_2O$ | 0.3 |  | 4.0 | 2.8 | 1.0 | 4.0 |
| Working point (° C.) | 650 | 570 | 545 | 580 | 570 | 545 |
| State of glass at sliding surface | | | | | | |
| Metal magnetic film | | | | | | |
| $Fe_{75}Ta_{10}N_{15}$ | ○ | ○ | ○ | X | X | X |
| $Fe_{73}Ta_8Si_{13}N_6$ | ○ | ○ | ○ | X | X | X |
| $Fe_{72}Nb_{12}Si_6N_{10}$ | ○ | ○ | ○ | X | X | X |
| $Fe_{76}Nb_8Si_2B_{12}N_2$ | ○ | ○ | ○ | X | X | X |
| $Fe_{72}Ni_{10}W_1Nb_{10}Ge_1N_6$ | ○ | ○ | ○ | X | X | X |
| $Fe_{79}Ta_9C_{12}$ | ○ | ○ | ○ | X | X | X |
| $Co_{92}Nb_4B_1N_3$ | ○ | ○ | ○ | X | X | X |
| $Co_{70}Nb_{10}Hf_5B_1N_{14}$ | ○ | ○ | ○ | X | X | X |
| $Co_{78}Nb_6Zr_4B_2N_{10}$ | ○ | ○ | ○ | X | X | X |
| $Co_{65}Ti_4Ta_4B_{20}N_7$ | ○ | ○ | ○ | X | X | X |
| $Co_{73}Mo_7Cr_6Zr_7B_3N_4$ | ○ | ○ | ○ | X | X | X |
| $Co_{70}Mn_6Nb_7B_{15}N_2$ | ○ | ○ | ○ | X | X | X |

EXAMPLE 2

Out of the glass having various compositions shown in Tables 1 to 8, the glass having a working point not higher than 650 degrees C. were used as the sealing glass to fabricate the magnetic head of the configuration shown in FIG. 1.

FIG. 1 shows an example of the configuration of the magnetic head according to the present invention, in which metal magnetic films 3, 4 with a high saturation flux density are formed on the magnetic gap opposing surfaces of the magnetic core halves 1, 2 made of ferrite, and these magnetic gap opposing surfaces are abutted with each other via a magnetic gap material 5 and secured with sealing glass 6, 7.

The glass was withdrawn from the molten glass into fibers of a diameter of 0.5 mm and a length of 30 mm to be used as a sealing glass. Mn—Zn single crystal ferrite was used as the ferrite to form the core halves of the magnetic head, a $Ta_Mb_Xc_Ad$ alloy film of a saturation magnetic flux density (Bs) not lower than 1 T as the metal magnetic film, and silica glass as the magnetic gap material.

In the formula $Ta_Mb_Xc_Ad$, T is at least one kind of metal selected from the group consisting of Fe, Co, and Ni; M is at least one kind of metal selected from the group consisting of Nb, Zr, Ti, Ta, Hf, Cr, Mo, W, and Mn; X is at least one kind of half metal/semiconductor selected from the group consisting of B, Si, and Ge; A is N or C; and a, b, c, and d represent atomic percent where $65 \leq a \leq 93$, $4 \leq b \leq 20$, $0 \leq c \leq 20$, $2 \leq d \leq 20$, and $a+b+c+d=100$. The composition of the alloy films used in the present example is shown in Tables 1 to 8.

Each of the fabricated magnetic heads was subjected to a magnetic tape running test under conditions of an ambient temperature of 23 degrees C. and a relative humidity of 70%, for 1000 hr to measure a wear depth of the sealing glass at the sliding surface from the original state. The wear depth is preferably not more than 0.2 micrometer. The measured results of the wear depth are shown in Tables 1 to 5.

Table 1 clearly shows that when $SiO_2$ is less than 17.2 wt %, wear resistance is decreased. Also when it is more than 25 wt %, the working point of glass exceeds 650 degrees C., which is therefore not preferable.

Table 2 reveals that when $B_2O_3$ is less than 1 wt %, the working point of glass exceeds 650 degrees C., and when more than 10 wt %, the wear resistance is degraded, which is therefore not preferable.

Table 3 reveals that when PbO is less than 58 wt %, the working point of glass exceeds 650 degrees C., and when more than 75 wt %, the wear resistance is degraded, which is therefore not preferable.

In order to improve the wear resistance of glass, it is preferable to improve water resistance in view of practical use. The glass of the present invention contains increased amounts of PbO, $Na_2O$, or $K_2O$ to achieve a low working point. However, on one hand, since the glass has low water resistance, $Al_2O_3$ or ZnO is added to improve the water resistance.

Table 4 reveals that not less than 0.2 wt % of at least one of $Al_2O_3$ and ZnO is preferably contained. However, when the total amount of $Al_2O_3$ and ZnO exceeds 7 wt %, the glass working point may exceed 650 degrees C. or the glass may be crystallized, which are not preferable.

$Na_2O$ and $K_2O$ as well as PbO have a tendency to lower the working point of glass.

Table 5 reveals that it is preferable to contain not less than 0.2 wt % of at least one of $Na_2O$ and $K_2O$. However, when the total amount of $Na_2O$ and $K_2O$ exceeds 5 wt %, the wear resistance will be degraded, which is therefore not preferable.

As described so far, the sealing glass which has a working point of not higher than 650 degrees C. and allows fabrication of a magnetic head with high wear resistance, preferably comprises 17.2 to 25 wt % of $SiO_2$, 1 to 10 wt % of $B_2O_3$, 58 to 75 wt % of PbO, 0.2 to 7 wt % of at least one of $Al_2O_3$ and ZnO, and 0.2 to 5 wt % of at least one of $Na_2O$ and $K_2O$.

However, even when the working point of sealing glass is not higher than 650 degrees C. as described above, if the viscosity of the glass under a heat treatment condition (not higher than 600 degrees C.) in the fabrication process of the magnetic head is too high, the glass may not sufficiently wet the magnetic core halves even when it is squeezed into under pressure, and thus may not securely seal them.

Table 6 shows the measured results of the yield of the fabricated magnetic heads during the sealing process. The yield indicates the proportion of the completed magnetic heads out of 500 magnetic heads fabricated excluding the ones in which sealing is incomplete due to the lack of fluidity of the glass or cracks are produced due to insufficient wettability. PbO has the effect of reducing the viscosity of the glass thereby increasing its fluidity. Therefore it can improve the wettability of the ferrite core by the glass thus improving the yield. Table 6 reveals that to complete the sealing of magnetic core halves at a high yield not lower than 90%, the content of PbO is preferably not less than 63 wt %.

Moreover, when the magnetic tape is driven under a high temperature, high humidity condition, the materials contained in the magnetic tape may react with the glass compositions thereby causing discoloring or erosion of the glass at the sliding surface of the magnetic head. Since these may cause degradation of the mechanical strength of the glass, discoloring and erosion of the glass are preferably prevented. Tables 7 and 8 show the result of the running test of each magnetic tape with the magnetic head being under the condition of an ambient temperature of 40 degrees C. and a relative humidity of 80% for 150 hours; in the table, the cases in which no changes are observed are marked by a 'circle' and cases with discoloration or erosion of the glass by a 'cross'.

Since $Al_2O_3$ and ZnO improve the chemical resistance of glass, they can reduce the reaction between the magnetic tape materials and the glass. To achieve this effect, both $Al_2O_3$ and ZnO are preferably contained. Table 7 reveals that the sealing glass more preferably contains not less than 0.5 wt % of $Al_2O_3$ and not less than 0.5 wt % of ZnO.

Since the high content of $Na_2O$ or $K_2O$ in glass reduces its chemical resistance, the glass containing of a high content of such substances is prone to be eroded. To prevent this phenomena, as revealed by Table 8, the total amount of $Na_2O$ and $K_2O$ is more preferably not more than 4 wt %.

Industrial Applicability

As described so far, the sealing glass for magnetic heads according to the present invention has excellent mechanical properties, and therefore a magnetic head utilizing this sealing glass offers excellent durability and high reliability conforming to high-density magnetic recording.

Furthermore, since the magnetic recording/reproducing device according to the present invention is provided with the above described magnetic head, it can reliably perform recording and reproducing of a large amount of magnetic information for a magnetic recording medium.

What is claimed is:

1. Sealing glass for a magnetic head comprising, by oxide conversion, 17.2 to 25 wt % of $SiO_2$, 1 to 10 wt % of $B_2O_3$, 58 to 75 wt % of PbO, 0.2 to 7 wt % of at least one of $Al_2O_3$ and ZnO, and 0.2 to 5 wt % of at least one of $Na_2O$ and $K_2O$.

2. The sealing glass for a magnetic head according to claim 1, comprising not less than 63 wt % by oxide conversion of PbO.

3. The sealing glass for a magnetic head according to claim 1 or 2, comprising, by oxide conversion, not less than 0.5 wt % of $Al_2O_3$, not less than 0.5 wt % of ZnO, and not more than 4 wt % of $Na_2O$ and $K_2O$ in total.

4. A magnetic head which is configured such that a pair of magnetic core halves are bonded together by use of sealing glass, at least one of the gap opposing surfaces of said magnetic core halves being formed with a metal magnetic film and said gap opposing surfaces being abutted with each other via a magnetic gap material, wherein said sealing glass is composed of the sealing glass for a magnetic head according to any of claims 1 to 2.

5. The magnetic head according to claim 4, wherein said metal magnetic film is composed of a TaMbXcAd alloy film, where T is at least one kind selected from the group consisting of Fe, Co, and Ni; M is at least one kind selected from the group consisting of Nb, Zr, Ti, Ta, Hf, Cr, Mo, W, and Mn; X is at least one kind of half metal/semiconductor selected from the group consisting of B, Si, and Ge; A is N or C; and a, b, c, and d represent atomic percent where $65 \leq a \leq 93$, $4 \leq b \leq 20$, $0 \leq c \leq 20$, $2 \leq d \leq 20$, and $a+b+c+d=100$).

6. A magnetic recording/reproducing device comprising the magnetic head according to claim 4 or 5, and a magnetic recording/reproducing device main unit.

7. A magnetic recording/reproducing device comprising the magnetic head according to claim 5, and a magnetic recording/reproducing device main unit.

8. Sealing glass for a magnetic head consisting essentially of, by oxide conversion, 17.2 to 25 wt % of $SiO_2$, 1 to 10 wt % of $B_2O_3$, 58 to 75 wt % of PbO, 0.2 to 7 wt % of at least one of $Al_2O_3$ and ZnO, and 0.2 to 5 wt % of at least one of $Na_2O$ and $K_2O$.

* * * * *

UNITED STATES PATENT AND TRADEMARK OFFICE
CERTIFICATE OF CORRECTION

PATENT NO. : 7,012,783 B2 Page 1 of 1
APPLICATION NO. : 10/275674
DATED : March 14, 2006
INVENTOR(S) : Shinya Hasegawa et al.

It is certified that error appears in the above-identified patent and that said Letters Patent is hereby corrected as shown below:

Title Page, Item (87) PCT Pub. Date
Change "Sep.9, 2002" to -- Sep. 19, 2002

Title Page (Page 2), Item (56) References Cited, FOREIGN PATENT DOCUMENTS
Delete Duplicate Reference "JP 02208811 8/1990"

Column 16
Line 12, change "1 to 2" to --1 or 2--

Column 16
Line 24, change "4 or 5" to -- 4 --

Signed and Sealed this

Fifteenth Day of August, 2006

JON W. DUDAS
*Director of the United States Patent and Trademark Office*